Aug. 27, 1963 E. BOSSHARD 3,101,953
DOUBLE SEAL INCLUDING MEANS FOR INDICATING LEAKS
Filed Jan. 30, 1961 2 Sheets-Sheet 1

Inventor:
ERNST BOSSHARD.
By K. H. Mayr.
Attorney:

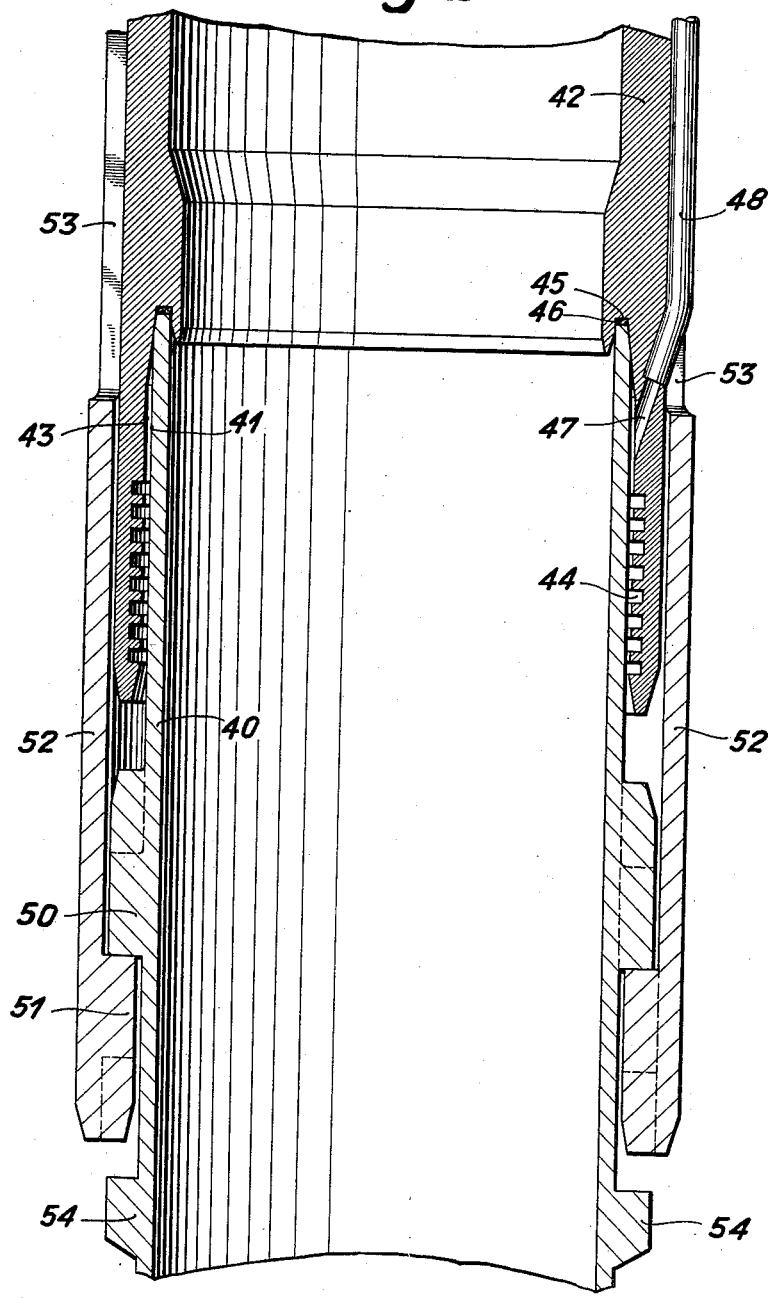

United States Patent Office 3,101,953
Patented Aug. 27, 1963

3,101,953
DOUBLE SEAL INCLUDING MEANS FOR INDICATING LEAKS
Ernst Bosshard, Winterthur, Switzerland, assignor to Sulzer Freres, S.A., Winterthur, Switzerland
Filed Jan. 30, 1961, Ser. No. 85,867
Claims priority, application Switzerland Feb. 4, 1960
3 Claims. (Cl. 277—2)

The present invention relates to a seal for sealing joints of elements having sides exposed to different pressures and to means for checking leakage of the joints.

It is known that seals whose sealing-tightness is very important can be checked by placing two sealing surfaces side by side and connecting the intermediate space to a pressure gauge or a trace detector.

The disadvantage of such seals, however, is that they require a considerable amount of space to accommodate the two seals side by side. Moreover, if the parts connected by the seal move away from one another both seals become ineffective. Furthermore, for example, in the case of two concentric contact-pressure seals, it is frequently difficult to obtain an even contact of the two seals and leaks are unavoidable.

It is an object of the invention to provide a seal which can be checked for leaks and remains tight in any normal operating position. This object is obtained by constructing one of the two seals which is on the lower pressure side as a sliding seal.

The invention provides a double seal and means for checking leakage therein which seal has tubular parts slidingly engaging each other without necessitating an increase of the diameter of the engaging parts. One of the seals can be opened without impairing the sealing effect of the second seal. If the second seal is of the labyrinth packing type a small quantity of the medium surrounding the seal, for example air, may be passed through the seal, for example, by suction and will act as a carrier for matter leaking through the first seal and transport the matter to a trace detector. If the suction effect is sufficiently strong and the first or main seal is damaged, all or a large portion of the matter leaking therethrough can be withdrawn, and escape into the ambient medium can be prevented. If the main seal is fully open, fluids may be supplied to or withdrawn from the space still sealed by the second seal through a suction conduit, for example, for flushing or cooling purposes.

The invention makes use of a sliding seal which serves for sealing the clearance between coaxial cylindrical surfaces engaging each other and being relatively slidable in axial direction. A sliding seal of this type is not affected by small changes of the clearance between the neighboring surfaces and these need not be cylindrical. They can also be, for example, conical or plane. In an embodiment of the invention a surface provided with the grooves may be provided on one of the relatively movable parts in a plane which is normal to the longitudinal axis of the relatively movable parts and may cooperate with a corresponding radial surface provided on the second part. This arrangement may be preferred if the seal must be as short as possible and space is available in the radial direction.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a schematic longitudinal sectional illustration of a seal of a fissionable material element as used in nuclear reactors.

Figure 1:
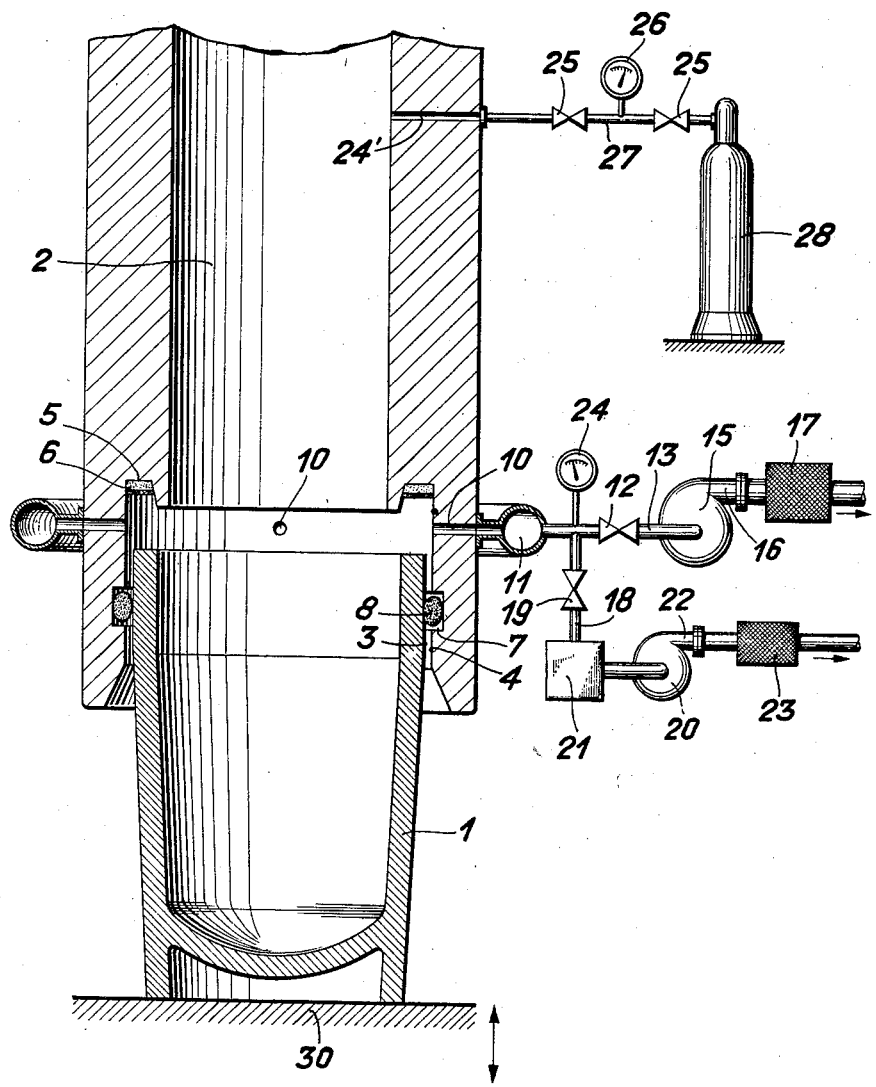
FIG. 1 is a schematic longitudinal sectional illustration of a seal of a reaction vessel.

Referring more particularly to FIG. 1 of the drawing, numeral 1 designates a hermetically sealed reaction vessel placed at the lower end of a supply pipe 2 for performing a reaction under a pressure higher than atmospheric pressure. The vessel 1 has a cylindrical outer surface portion 3 whose diameter is slightly smaller than the diameter of a cylindrical bore 4 at the lower end of the pipe 2. At the inner end of the cylindrical bore 4 the pipe 2 has an annular axial groove 5 wherein a high pressure seal 6 is placed. The wall of the bore 4 is provided with an annular groove 7 containing a sealing ring 8 of resilient material. The portion of the pipe 2 between the grooves 5 and 7 is provided with radial bores 10 connecting the interior of the pipe with an annular header 11. A suction pipe 13 of a blower 15 is connected to the header 11 and provided with a valve 12. The delivery pipe 16 of the blower contains an air filter 17. A suction pipe 18 of a fan 20 is also connected to the header 11 and contains a valve 19 and a chemical trace detector 21. The delivery pipe 22 of the fan 20 is provided with a filter 23. A pressure gauge 24 is also connected to the header 11. The pipe 2 has a radial bore 24' through which an inert gas, for example nitrogen, serving for flushing, can be supplied through a pipe 27 provided with valves 25 and a pressure gauge 26 therebetween. The vessel 1 rests on a table 30 which can be raised and lowered as shown by arrows in FIG. 1 for obtaining access to the pressure vessel and also for producing the desired pressure on the seal 6.

To carry out the desired reaction the table 30 with the vessel 1 is lifted so that the sealing ring 8 comes into contact with the cylindrical surface 3 of the vessel 1. After opening of the valve 12 air is withdrawn from the interior of the pipe 2 and from the vessel 1 by means of the blower 15. By opening the valves 25 the interior of the apparatus can be flushed with inert gas from the tank 28. Thereupon the table 30 is lifted higher and the vessel 1 is pressed against the seal 6. The substances which are to react with one another are introduced into the vessel 1 through the pipe 2. During the reaction the blower 20 withdraws the gas from the space between the seals 6 and 8 through the openings 10, the header 11, and through the trace detector 21. The latter immediately detects any leakage through the seal 6 so that the pressure exerted by the table 30 on the seal 6 can be increased and, if this is not sufficient, steps can be taken to change the seal 6.

After the reaction in the vessel 1 has been duly completed, the table 30 is lowered until the seal 6 becomes ineffective without affecting the operation of the seal 8 and connecting the interior of the vessel 1 and of the pipe 2 with the outside. The interior of the pipe 2 and of the vessel 1 are then flushed with inert gas by opening the valves 25 and the valve 12, whereupon the table 30 is farther lowered so that the vessel 1 containing the reaction products can be removed. The escape of any gases or vapors which are injurious to health from the reaction chamber is prevented by the filters 17 and 23 at the outlets of the fans 15 and 20.

FIG. 2 shows the connection of a tubular element 40 containing fissionable material of a nuclear reactor to a connecting conduit for a coolant. The upper end of the element has a cylindrical outer surface 41 whose diameter of a cylindrical bore 43 formed in the lower end of a connecting part 42. The portion of the cylindrical bore 43 facing the cylindrical surface 41 is provided with annular grooves 44 as they are known in labyrinth packings. An axial annular groove 45 is provided at the inner end of the bore 43 of the connecting part 42, a sealing ring 46 being placed in the groove 45. The correspondingly constructed end of the tubular element 40 is pressed against this sealing ring. The part 42 is provided with a bore 47 between the annular grooves 44 and the groove 45, a pipe 48 being connected to the bore 47. The outside of the element 40 is provided with projections 50 as used in bayonet unions which projections cooperate with corresponding projections 51 on a retaining part 52. The latter can be rotated about the connecting part 42, is slidable in the axial direction, and has cutouts 53 accommodating the pipe 48 and, if desired, other pipes, not shown. The element 40 is provided with an annular shoulder 54 below the lower end of the part 52.

In the assembled position, the element 40 is axially pressed by the retaining part 52 against the seal 46 in the connecting part 42. Coolant is fed through the connecting part 42 to the element 40, is heated therein, and is removed from the element through the connecting part 42 in a conventional manner, not shown, for example, by providing a pipe coaxial of and inside the element 40. Air is continuously withdrawn from the annular space between the parts 40 and 42 and between the seal 46 and the labyrinth packing formed by the annular grooves 44 through the tube 48 and a fan, not shown, and is fed to a trace detector which, in this case, is sensitive to radiation. This operation causes air to flow through the annular space between the parts 52 and 42 and leaks through the labyrinth seal. Leakage through the seal 46 is sensed by the trace detector. To tighten the seal 46 the axial pressure exerted by the part 52 on the element 40 is increased. If that is not sufficient, as will be indicated by the trace detector, the seal 46 must be replaced.

If the element 40 must be exchanged by a new one, the part 52 is lowered whereby the seal 46 is loosened. If the element 40 sticks to the part 42, part 52 is lowered until it abuts against the projection 54 on the element 40 and the latter is forcibly separated from the part 42. During this operation the supply of coolant to the element is interrupted, causing a dangerous temperature increase. To avoid this the interior of the element 40 can be filled with water through the pipe 48 after the element 40 has been separated from the seal 46. The labyrinth packing effect of the annular grooves 44 prevents any considerable loss of water. By rotation of the part 52 around the element 40 the projections 50 and 51 can be brought to a relative position affording removal of the element 40 in downward direction. A new element is introduced from below into the bore 43 of the retaining part 42, is engaged by the part 52, and is axially pressed against the part 42. The supply of coolant can now be restored and suction through the pipeline 48 can be initiated.

I claim:

1. In a sealing device for sealing a joint of two telescoped elements movable relatively to each other and separating spaces containing fluids under different pressures, two spaced sealing means defining a chamber between the two elements, one of said sealing means being interposed between the space containing fluid under a relatively high pressure and said chamber, the second of said sealing means being interposed between said chamber and the space containing fluid under a relatively low pressure, said first sealing means being mounted in one element and opposed to a surface of the other element whereby the seal may be made tight upon relative movement of the two elements in one direction and may be opened upon relative movement of the two elements in the opposite direction, said second sealing means being connected to one of said elements and in sliding engagement with the other element thereby affording relative movement of the two elements in opposite directions for opening and closing the first sealing means, and a conduit connecting said chamber to the outside of the device for checking the presence of fluid of the relatively high pressure space in said chamber.

2. In a sealing device as defined in claim 1 wherein said first sealing means is plane and the direction of relative movement of the two elements afforded by said second sealing means is normal to the plane of said first sealing means.

3. In a sealing device as defined in claim 1 wherein said second sealing means is in the form of a labyrinth packing.

References Cited in the file of this patent
UNITED STATES PATENTS

| | | |
|---|---|---|
| 2,404,664 | Skinner | July 23, 1946 |
| 2,748,869 | Hager | June 5, 1956 |